United States Patent
Nakamura et al.

[11] Patent Number: 5,834,912
[45] Date of Patent: Nov. 10, 1998

[54] MOTOR SPEED CONTROL DEVICE

[75] Inventors: Hiroshi Nakamura; Kazuhiro Tsuruta, both of Kitakyushu, Japan

[73] Assignee: Kabushiki Kaisha Yashawa Denki, Fukuoka, Japan

[21] Appl. No.: 776,672

[22] PCT Filed: Aug. 2, 1995

[86] PCT No.: PCT/JP95/01534

§ 371 Date: Feb. 4, 1997

§ 102(e) Date: Feb. 4, 1997

[87] PCT Pub. No.: WO96/04708

PCT Pub. Date: Feb. 15, 1996

[30] Foreign Application Priority Data

Aug. 5, 1994 [JP] Japan .................................. 6-204559

[51] Int. Cl.$^6$ .................................................. H02P 5/00
[52] U.S. Cl. ............................................ 318/268; 318/610
[58] Field of Search ........................... 318/609, 610, 318/268

[56] References Cited

U.S. PATENT DOCUMENTS

| | | | |
|---|---|---|---|
| 4,904,915 | 2/1990 | Kurakake | 318/568.22 |
| 5,325,460 | 6/1994 | Yamada et al. | 318/811 |
| 5,521,481 | 5/1996 | Yamada | 318/632 |

FOREIGN PATENT DOCUMENTS

| | | |
|---|---|---|
| 0 403 658 A1 | 12/1990 | European Pat. Off. . |
| 57-203958 | 12/1982 | Japan . |
| 59-6782 | 1/1984 | Japan . |
| 59-214921 | 12/1984 | Japan . |
| 61-277391 | 12/1986 | Japan . |
| 62-260574 | 11/1987 | Japan . |
| 1-107687 | 4/1989 | Japan . |
| 2-307384 | 12/1990 | Japan . |
| 4-9767 | 1/1992 | Japan . |
| 5-30772 | 2/1993 | Japan . |
| 5-260777 | 10/1993 | Japan . |
| 6-162614 | 6/1994 | Japan . |

*Primary Examiner*—Bentsu Ro
*Attorney, Agent, or Firm*—Morgan, Lewis & Brockius LLP

[57] ABSTRACT

A motor speed controller which detects the position $y(i-k)$ of a motor at the time $K \cdot T_s$ ($k \geq 0$, $T_s$: sampling period) ago from the present time (i) and feedback-controls the speed of the motor by using a motor speed feedback signal Vfb calculated based on the detection signal is provided with a means which calculates a torque command $u(i)$ from a speed command and the motor speed feedback signal vfb, means which calculates the speed $v(i-k)$ from the position $y(i-k)$, means which stores the values of the speed $v(i-m)$ ($m=k, \ldots, M'$) from M' sampling periods before to the time i-K, a predictor which predicts the speed prediction value $v^*(i+m)$ ($m=-K+1, \ldots, M$) at the times up to M sampling periods after from the dynamic characteristic model of the motor, the torque command $u(i)$, and the position $y(i-K)$, and means which finds the speed feedback signal from formula:

$$v_{fb}(i) = \sum_{m=-K+1}^{M} W_m v^*(i+m) + \sum_{m=K}^{N'} W'_m v(i-m)$$

where Wm and W'm represent weight factors.

6 Claims, 4 Drawing Sheets

MOTOR SPEED CONTROL DEVICE

This application is a National Stage of International Application PCT/JP95/01534 under 35 U.S.C. §371, the application having been filed on Aug. 2, 1995, and which is hereby incorporated by reference.

TECHNICAL FIELD

This invention relates to a motor speed control device.

BACKGROUND ART

Heretofore, for motor speed feedback control, a speed detector such as a tachometer generator is popularly employed. However, recently a system has been intensively employed in which a feedback speed signal is calculated from position data which is detected, for instance, with an encoder. In this speed feedback signal calculating method, the following formula is generally employed: $v=\Delta y/T s$ where $\Delta y$ is an increment during a sampling period Ts of a position signal.

However, the method suffers from the following difficulties: The phase of the speed signal thus calculated lags the actual speed, and, accuracy in a range of low speeds is considerably deteriorated. The latter problem that the accuracy in a range of low speeds is considerably deteriorated, has been solved by obtaining a moving average of a plurality of past points. However, in this case, the phase lag is further increased. In the case where the sampling period is long, or the position detection is delayed, the phase lag is further increased. If the feedback control is carried out with the signal which lags in phase in the above-described manner, it is impossible to set the feedback gain to a high value, and accordingly the response speed becomes low.

On the other hand, Japanese Patent Unexamined Publication No. Hei. 4-9767 has disclosed a method in which the speed at a calculation time instant is predicted and detected. However, the method is disadvantageous in the following points: In the method, the operating characteristics of the motor, and the torque command are not taken into account; that is, the prediction is carried out only on the basis of the position data detected by an encoder or the like, and therefore the predicted value may be different from the actual value.

DISCLOSURE OF THE INVENTION

In view of the foregoing, an object of the invention is to provide a motor speed control device in which a speed is predicted from position data detected with an encoder or the like, the operating characteristics of a motor, and a torque command, and a weighted moving average thereof is calculated, so that the feedback signal is less deteriorated in accuracy when the motor is in a range of low speeds, and has no phase lag.

The foregoing object of the invention has been achieved by the provision of a motor speed control device in which, at the present time instant i, a motor position $y(i-K)$ which was provided K·Ts before a motor speed $v(i)$ or a motor position $y(i)$ (where $K \geq 0$, and Ts is the sampling period) is detected to provide a detection signal, and feedback control is carried out with a motor speed feedback signal $V_{fb}$ which is calculated from the detection signal, which, according to the invention, comprises:

means for calculating a torque command $u(i)$ from a speed command and the motor feed back signal $V_{fb}$;
means for calculating a speed $v(i-K)$ from the position $y(i-K)$;

means for storing the speed $v(i-m)$ (where $m=K, \ldots, M'$) which occurs from a past M'-th sampling to a time instant $i-K$;

a predictor for obtaining a speed prediction value $v^*(i+m)$ (where $m=-K+1, \ldots, M$) at a future M-th sampling from a motor's dynamic characteristic model, the torque command $u(i)$ and the position $y(i-K)$; and means for calculating the speed feedback signal from the following formula:

$$v_{fb}(i) = \sum_{m=-K+1}^{M} W_m v^*(i+m) + \sum_{m=K}^{M'} W_m v(i-m)$$

With the above-described means, a speed feedback signal which is less deteriorated in accuracy, and has no phase lag is obtained. Hence, the feedback loop gain is high, and the speed control system is high in response frequency.

BEST MODE FOR CARRYING OUT THE INVENTION

First, an example of a motor speed control device, which constitutes a first embodiment of the invention, will be described.

Figure 1:
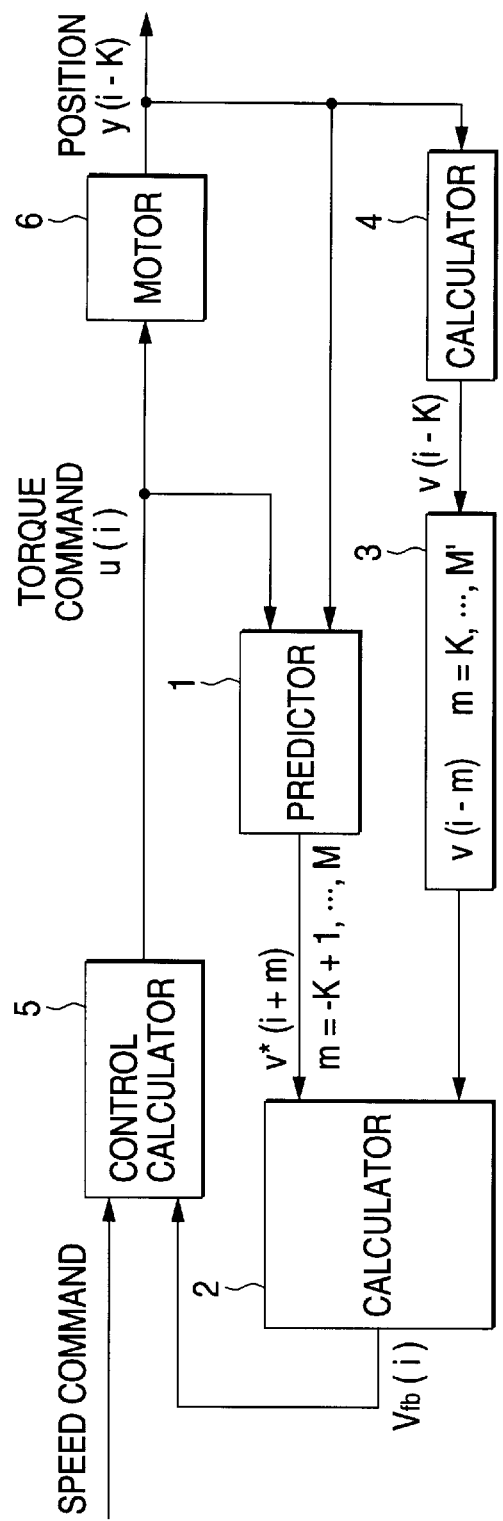
FIG. 1 is a block diagram showing a specific embodiment of the invention.

In FIG. 1, reference numeral 5 designates a control calculator which receives a speed command and a feedback signal $V_{fb}$, and outputs a torque command u; and 6, a unit including a torque controller, a motor, and a position detector. The unit 6 receives a torque instruction $u(i)$ at the present time instant i, and outputs a motor position detection value $y(i-K)$ which is obtained K·Ts before ($K \geq 0$, and Ts: sampling period). Reference numeral 1 designates a predictor which obtains a speed prediction value $v^*(i+m)$ (where $m=-K+1, \ldots, M$) at a future M-th sampling from a motor's dynamic characteristic model, torque command u, and a position y. Reference numeral 4 designates a calculator which calculates a speed $v(i-K)$ from a position $y(i-K)$ according to $v(i-K)=\Delta y(i-K)/Ts$ ($\Delta$ represents an increment value during a sampling period Ts). Reference numeral 3 denotes a memory which stores a speed $v(i-m)$ which is provided from a past M'-th sampling till a time instant $i-K$ (where $m=K, \ldots, M'$). Reference numeral 2 denotes a calculator which obtains a speed feedback signal $V_{fb}$ according to the following Formula (1), and applies it to the control calculator 5.

$$v_{fb}(i) = \sum_{m=-K+1}^{M} W_m v^*(i+m) + \sum_{m=K}^{N'} W_m v(i-m) \quad (1)$$

With respect to weights Wm and W'm, the average of speeds may be obtained on the basis of $Wm=W'm=1/(M+M'+1)$, or they may be so set as to be one in total by weighting the respective speeds with different weights. M and M' function as follows: The difference M−M' adjusts the phase of the speed feedback signal, the sum M+M' adjusts the speed resolution, and with M≧M', a feedback signal has no phase lag.

Now, concrete examples of the predictor will be described with reference to FIGS. 2 and 3.

Figure 2:
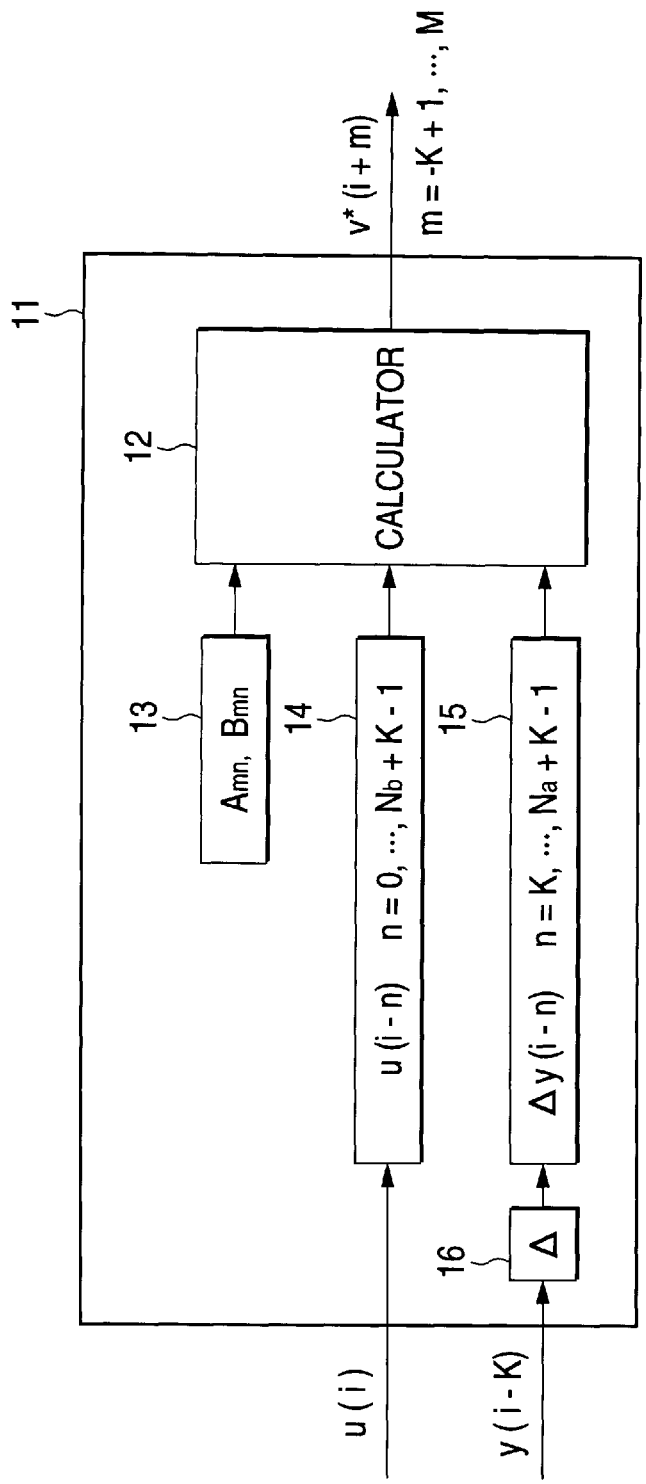
FIG. 2 is an internal block diagram showing the arrangement of an example of a predictor of the invention.

In FIG. 2, reference numeral 11 designates the predictor; 13, a memory for storing prediction coefficients $A_{mn}$ and $B_{mn}$; 14 and 15, memories for storing past torque command u and past position increment values Δy which occur until the present time instant, respectively, and 16, a differential unit which obtains a position increment value Δy from a position y.

Further in FIG. 2, reference numeral 12 designates a calculator, which calculates and outputs a speed prediction value v*(i+m) according to the following Formulae (2a) and (2b):

$$v^*(i-m) = \Delta y^*(i+m)/Ts \quad (2a)$$

$$\Delta y^*(i+m) = \sum_{n=K}^{Na+K-1} A_{mn}\Delta y(i-n) + \sum_{n=0}^{Nb+K-1} B_{mn}u(i-n) \quad (2b)$$

$$m = -K+1, \ldots, M$$

Figure 3:
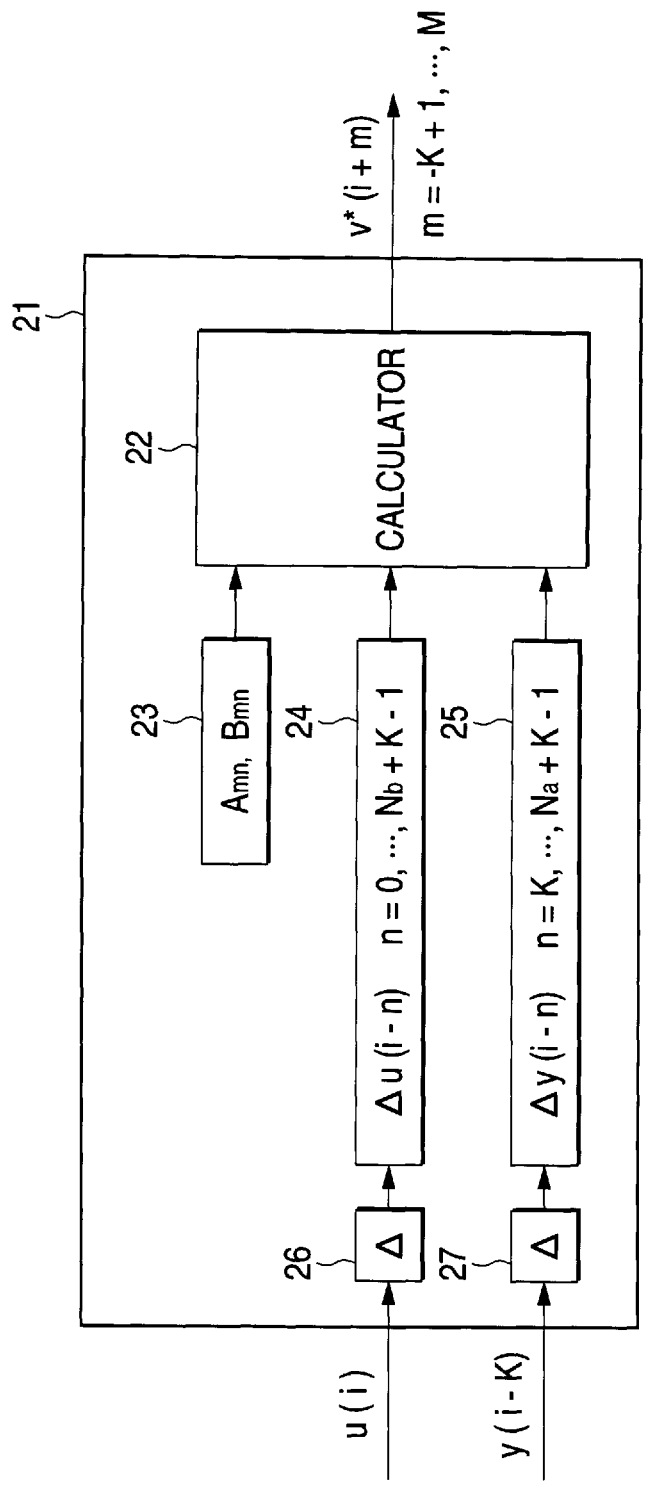
FIG. 3 is an internal block diagram showing the arrangement of another example of a predictor of the invention.

In FIG. 3, reference numeral 21 designates the predictor; 23, a memory for storing prediction coefficients $A_{mn}$ and $B_{mn}$; 24 and 25, memories for storing past torque instruction increment values Δu and past position increment values Δy which occurs until the present time instant, respectively, and 26 and 27, differential units which obtain increment values.

Further in FIG. 3, reference numeral 22 designates a calculator, which calculates and outputs a speed prediction value v*(i+m) according to the following Formulae (3a) and (3b):

$$v^*(i+m) = \Delta y^*(i+m)/Ts \quad (3a)$$

$$\Delta y^*(i+m) = \sum_{n=K}^{Na+K-1} A_{mn}\Delta y(i-n) + \sum_{n=0}^{Nb+K-1} B_{mn}\Delta u(i-n) \quad (3b)$$

$$m = -K+1, \ldots, M$$

Now, the prediction coefficients in Formulae (2b) and (3b) will be described.

It is assumed that a transfer function model from a torque command u till a position increment value Δy is of a discrete-time system as follows:

$$Gv(z) = (b_1 z^{-1} + \ldots + b_{Nb} z^{-Nb})/(1 - a_1 z^{-1} - \ldots - a_{Na} z^{-Na})$$

Then, its input/output model is as indicated in the following Formula (4):

$$\Delta y(i) = \sum_{n=1}^{Na} a_n \Delta y(i-n) + \sum_{n=1}^{Nb} b_n u(i-n) \quad (4)$$

At the time instant i, the actually measured value Δy(i−n) (n≧K) of the position increment value which is provided until the time instant i−K, is obtained. Hence, prediction is made according to the following Formulae (5a) and (5b) by use of the measured position increment value:

$$\Delta y^*(i-K+1) = \sum_{n=1}^{Na} a_n \Delta y(i-K+1-n) + \sum_{n=1}^{Nb} b_n u(i-K+1-n) \quad (5a)$$

$$m = -K+1$$

$$\Delta y^*(i+m) = \sum_{n=1}^{m+K-1} a_n \Delta y^*(i+m-n) + \quad (5b)$$

$$\sum_{n=m+K}^{Na} a_n \Delta y(i+m-n) + \sum_{n=1}^{Nb} b_n u(i+m-n)$$

$$m > -K+1$$

As a result, the position increment value prediction value Δy*(i+m) is represented by Formula (2b), and if it is assumed that a future torque command is u(j)=0 (j>i), then the prediction coefficients $A_{mn}$ and $B_{mn}$ are as follows:

$$A_{(-k+1)n} = a_{(n-K+1)} m = -K+1, K \leq n \leq N_a+K-1 \quad (6a)$$

$$A_{mn} = \sum_{j=1}^{m+K-a} a_j A_{(m-j)n} + a_{(n+m)} \quad (6b)$$

$$m > -K+1, K \leq n \leq Na+K-1$$

$$B_{(-k+1)n} = b_{(n-K+1)} \quad (7a)$$

$$m = -K+1, 0 \leq n \leq Nb+K-1$$

$$B_{mn} = \sum_{j=1}^{m+K-1} a_j B_{(m-j)n} + b_{(n+m)} \quad (7b)$$

$$m > -K+1, 0 \leq n \leq Nb+K-1$$

Where, $a_n=0$ (n>$N_a$), and $b_n=0$ (n<1 and n>$N_b$). If u(j)=u(i) (where j>i), then $B_{mo}$ in Formula (7b) is as follows:

$$B_m = 0 - K + 1 < m \leq 0$$

$$B_{mo} = \sum_{j=1}^{m+K-1} a_j B_{(m-j)0} + \sum_{J=1}^{m} b_j \quad (7b')$$

$$m \geq 1$$

In the case where a transfer function model from a torque command increment value Δu to a position increment value Δy is $Gp(z) = (b_1 z^{-1} + \ldots + b_{Nb} Z^{-Nb})/(-1 a_1 z^{-1} - \ldots - a_{Na} z^{-Na})$, then its input and output model is represented by the following Formula (8):

$$\Delta \hat{y}(i) = \sum_{n=1}^{Na} a_n \Delta \hat{y}(i-n) + \sum_{n=1}^{Nb} b_n \Delta u(i-n) \quad (8)$$

Formula (3b) is obtained by predicting a position increment value similarly as in the case of Formula (5). And if a future torque command increment value is Δu(j)=0 (where j>i), then prediction coefficients $A_{mn}$ and $B_{mn}$ are as follows:

$$A_{(-k+1)n} = a_{(n-K+1)} m = -K+1, K \leq n \leq N_a+K-1 \quad (9a)$$

$$A_{mn} = \sum_{j=1}^{m+K-1} a_j A_{(m-j)n} + a_{(n+m)} \quad (9b)$$

$$m > -K+1, K \leq n \leq Na+K-1$$

$$B_{(-k+1)n} = b_{(n-K+1)} m = -K+1, 0 \leq n \leq Nb+K-1 \quad (10a)$$

$$B_{mn} = \sum_{j=1}^{m+K-1} a_j B_{(m-j)n} + b_{(n+m)} \quad (10b)$$

$$m > -K+1, 0 \leq n \leq Nb+K-1$$

where $a_n=0$ (n>$N_a$), and $b_n=0$ (n<1 and n>$N_b$).

When, with K=0 and with a continuous transfer function model from torque command to position as $1/JS^2$, discretion is effected with the zero-th order hold and sampler taken into account, then the coefficients of the model Gv(z) of the predictor shown in FIG. 2 are Na=1, $a_1=1$, $N_b=2$, $b_1=b_2=b=T_s^2/2J$ and the coefficients of the model Gp(z) of the predictor shown in FIG. 3 are Na=2, $a_1$=2, $a_2$=−1, $N_b$=2, $b_1$=$b_2$=b=$T_s^2$/2J.

In the case where the predictor shown in FIG. 2 is employed and M=2, the coefficients in Formula (2b) are $A_{10}$=$A_{20}$=1, $B_{10}$=$B_{11}$=b, $B_{20}$=3b, and $B_{21}$=b according to Formulae (6), (7) and (7b').

If, in Formula (1), M'=0, $w_2$=0.5, $w_1$=$w'_0$=0.25, then the following Formula (11) is obtained according to Formulae (1) and (2):

$$v_{fb}(i)=[\Delta y(i)+b\{1.75u(i)+0.75u(i-1)\}]/T_s \quad (11)$$

It goes without saying that, in FIG. 1, the predictor 1 and the calculators 2 and 4 are provided as one unit to obtain $V_{fb}(i)$.

Figure 4:
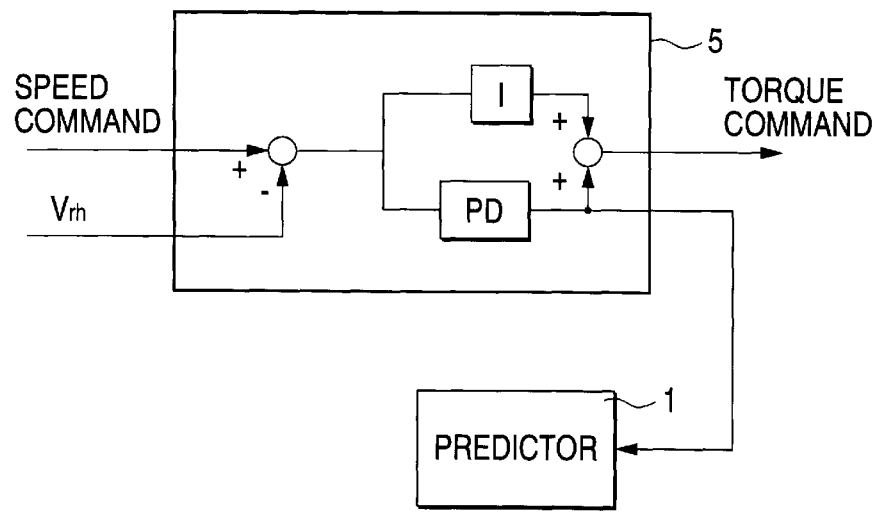
FIG. 4 is an internal block diagram showing the arrangement of an example of a control calculator of the invention.

In the case where the detection value or prediction value of a disturbance torque $u_d$ is obtained, the difference which is obtained by subtracting the disturbance torque $u_d$ from the torque command u may be employed as a torque command to obtain the speed prediction value. In the case where, in the control calculator 5, the torque command is determined from an operation which includes PID control and I-P control integration operations, the resultant integration operation value may be employed as the aforementioned disturbance torque prediction value. For instance in the case where, as shown in FIG. 4, the control calculator 5 calculates a torque command by PID operation, the difference obtained by subtracting an integration operation value from a torque instruction; that is, only the PD (proportional and differential) operation value is applied, as a torque command, to the predictor 1.

Figure 5:
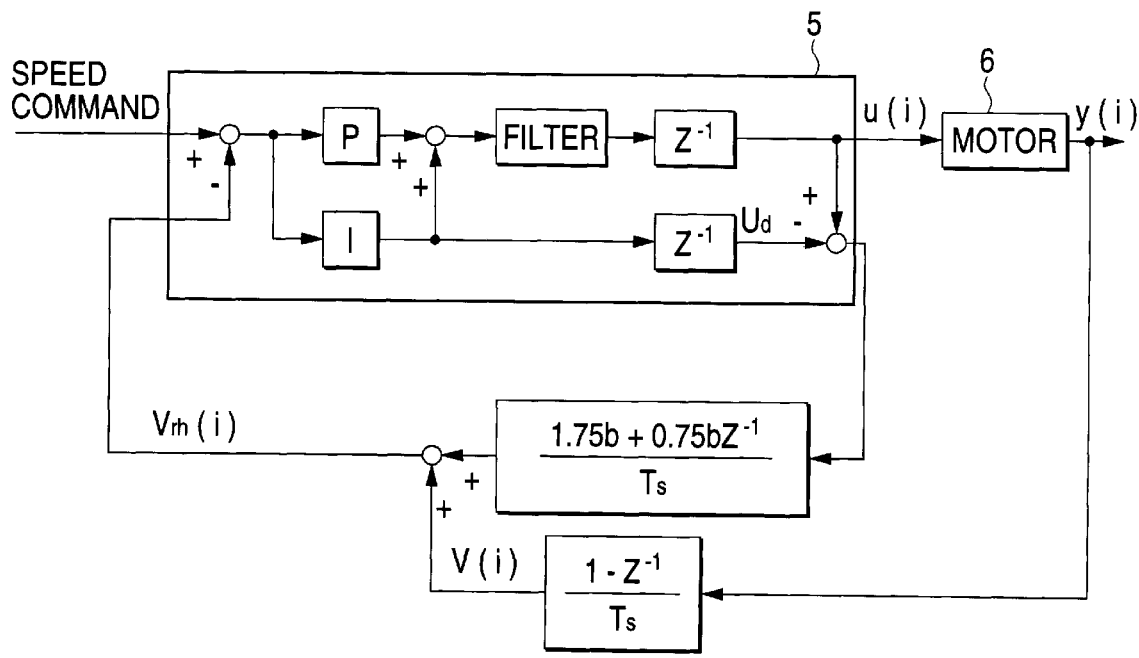
FIG. 5 is a block diagram showing another embodiment of the invention.

FIG. 5 is a block diagram for a description of the case where, when a control calculator outputs the PI operation value subjected to primary filtering or n-th order filtering as a torque command u(i) at the next sampling period, the speed feedback signal $V_{fb}(i)$ is obtained according to Formula (11). In the circuit shown in FIG. 5, an integration value provided one period before is employed as a disturbance torque $u_d$; however, it may be subjected to filtering to obtain a disturbance torque $u_d$. A speed v(i) is obtained according to $\Delta y(i)/T_s$; however, the invention is not limited thereto or thereby. That is, it may be obtained according to a conventional speed calculating method such as a method of using a speed detector, or a method of calculating the speed by measuring the pulse duration time of an encoder.

As was described above, in the motor speed control device of the invention, the speed feedback signal is employed which is less deteriorated in accuracy when the motor is in a range of low speeds, and has no phase lag. Hence, the motor speed control device is high in feedback loop gain, and high in response characteristic.

INDUSTRIAL APPLICABILITY

The invention is applied to a motor speed control device. What is claimed is:

1. A motor speed control device in which, at present time instant i, a prior time motor position y(i−K) (where K≧0) is detected to provide a detection signal, and a motor speed feedback signal $V_{fb}$ is calculated using the detection signal for feedback control, comprising:

means for calculating a torque command u(i) from a speed command and the motor speed feed back signal $V_{fb}$;

means for calculating a speed v(i−K) from the prior time motor position y(i−K);

means for storing a motor speed v(i−m) (where m=K, . . . , M') which occurs from a past M'-th sampling to a time instant i−K;

a predictor for obtaining a speed prediction value v*(i+m) (where m=−K+1, . . . , M) at a future M-th sampling from a motor dynamic characteristic model, the torque command u(i) and the prior time motor position y(i−K); and means for calculating the motor speed feedback signal from the following formula:

$$V_{fb}(i) = \sum_{m=-K+1}^{M} W_m v^*(i+m) + \sum_{m=k}^{M'} W'_m v(i-m)$$

where $W_m$ and $W'_m$ are weight coefficients.

2. The motor speed control device as claimed in claim 1, wherein the predictor further includes:

means for obtaining a position increment value $\Delta y$ from the prior time motor position y(i−K), where $\Delta$ represents an increment value for a sampling period Ts;

means for determining, on the basis of a transfer function model, from the torque command u(i) till a position increment value $\Delta y$, $Gv(z)=(-b_1z^{-1}+ \ldots +b_{Nb}z^{-Nb})/(1-a_1z^{-1}- \ldots -a_{Na}z^{-Na})$, prediction coefficients $A_{mn}$ and $B_{mn}$ according to the following formulae $$A_{(-k+1)n}=a_{(n-K+1)}, m=-K+1, K \leq n \leq N_a+K-1$$

$$A_{mn} = \sum_{j=1}^{m+K-a} a_j A_{(m-j)n} + a_{(n+m)}$$

$$m > -K + 1, K \leq n \leq N_a + K - 1$$

$$B_{(-k+1)n}=b_{(n-K+1)}, m=-K+1, 0 \leq n \leq N_b+K-1$$

$$B_{mn} = \sum_{j=1}^{m+K-1} a_j B_{(m-j)n} + b_{(n+m)}$$

$$m > -K + 1, K \leq n \leq N_b + K - 1$$

where $a_n$=0 (n>$N_a$), and $b_n$=0 (n<1 and n>$N_b$);

means for storing past torque command values and position increment values until the present time instant i; and means for obtaining the speed prediction value v*(i+m) based on the prediction coefficients $A_{mn}$ and $B_{mn}$, torque command values, and position increment values, and the following formulae:

$$v^*(i+m)=\Delta y^*(i+m)/Ts$$

$$\Delta y^*(i+m) = \sum_{n=K}^{Na+K-1} A_{mn}\Delta y(i-n) + \sum_{n=0}^{Nb+K-1} B_{mn}u(i-n)$$

$$m = -K + 1, \ldots, M.$$

3. The motor speed control device as claimed in claim 2, further including:

means for employing the following formulae to calculate $B_{mo}$:

$$B_{mo}=0-K+1<m\leq0$$

$$B_{mo} = \sum_{j=1}^{m+K-1} a_j B_{(m-j)0} + \sum_{j=1}^{m} b_j$$

$$m \geq 1.$$

4. The motor speed control device as claimed in claim 1, wherein the predictor further includes:

means for obtaining a position increment value $\Delta y$ and the torque command increment value $\Delta u$ from the motor position y(i−K) and the torque command u(i);

means for determining, on the basis of a transfer function model, from a torque increment $\Delta u$ till a position increment value $\Delta y$, $Gp(z)=(-b_1z^{-1}+ \ldots +b_{Nb}z^{-Nb})/(1-a_1z^{-1}- \ldots -a_{Na}z^{-Na})$, prediction coefficients $A_{mn}$ and $B_{mn}$ according to the following formulae, and storing the prediction coefficients $A_{mn}$ and $B_{mn}$:

$$A_{(-k+1)n}=a_{(n-K+1)}, m=-K+1, K \leq n \leq N_a+K-1$$

$$A_{mn} = \sum_{j=1}^{m+K-1} a_j A_{(m-j)n} + a_{(n+m)}$$

$$m > -K + 1, K \leq n \leq N_a + K - 1$$

$$B_{(-k+1)n}=b_{(n-K+1)}, m>-K+1, 0 \leq n \leq N_b+K-1$$

$$B_{mn} = \sum_{j=1}^{m+K-1} a_j B_{(m-j)n} + b_{(n+m)}$$

$$m > -K + 1, K \leq n \leq N_b + K - 1$$

where $a_n=0$ ($n>N_a$), and $b_n=0$ ($n<1$ and $n>N_b$);

means for storing past torque command increment values and position increment values until a present time instant i; and means for obtaining, based on the prediction coefficients $A_{mn}$ and $B_{mn}$, torque command increment values, and position increment values, the speed prediction value $v^*(i+m)$ according to the following formulae:

$$v^*(i+m)=\Delta y^*(i+m)/Ts$$

$$\Delta y^*(i+m) = \sum_{n=K}^{Na+K-1} A_{mn}\Delta y(i-n) + \sum_{n=0}^{Nb+K-1} B_{mn}\Delta u(i-n)$$

$$m = -K + 1, \ldots, M.$$

5. A motor speed control device as claimed in claim 1, further including:

means for obtaining the detection value or prediction value of a disturbance torque $u_d$; and means for obtaining the speed prediction value $v^*(i+m)$ with the difference regarded as the torque command obtained by subtracting the disturbance torque $u_d$ from the torque command u(i).

6. A motor speed control device as claimed in claim 5, wherein an integration operation value is employed as the disturbance torque $ud$ when a torque command is determined by an operation including a PID control or I-P control integration operation.

* * * * *

UNITED STATES PATENT AND TRADEMARK OFFICE
CERTIFICATE OF CORRECTION

PATENT NO. : 5,834,912
DATED : November 10, 1998
INVENTOR(S) : Hiroshi Nakamura et al.

It is certified that error appears in the above-identified patent and that said Letters Patent is hereby corrected as shown below:

Title page,
Item [57], ABSTRACT, line 19, change

"$\sum_{m=K}^{N'} W'_m v(i-m)$" to -- $\sum_{m=K_b}^{M'} W''_m v(i-m)$ --.

Column 6,
Line 22, change "$A_{(-k+1)m}=a_{(n-K+1)}, m=-K+1, K \leq n \leq N_a+K-1$" to
-- $A_{(-k+1)m}=a_{(n-K+1)}$   $m=-K+1, K \leq n \leq N_a+K-1$ --.
Line 29, change "$B_{(-k+1)m}=b_{(n-K+1)}, m=-K+1, 0 \leq n \leq N_b+K-1$" to
-- $B_{(-k+1)m}=b_{(n-K+1)}$   $m=-K+1, 0 \leq n \leq N_b+K-1$ --.
Line 34, change "$m > -K+1, K \leq n \leq N_b+K-1$" to
-- $m > -K+1, 0 \leq n \leq N_b+K-1$ --.
Line 55, change "$B_{mo}=0-K+1, <m\leq 0$" to -- $B_{mo}=0$    $-K+1, <m\leq 0$ --.

Column 7,
Line 5, change "$A(-k+1)n=a_{(n-K+1)}, m=-K+1, K \leq n \leq N_a+K-1$" to
-- $A_{(-k+1)n}=a_{(n-K+1)}$   $m=-K+1, K \leq n \leq N_a+K-1$ --.
Line 11, change "$B_{(-k+1)m}=b_{(n-K+1)}, m>-K+1, 0 \leq n \leq N_b+K-1$" to
-- "$B_{(-k+1)m}=b_{(n-K+1)}$   $m>=-K+1, 0 \leq n \leq N_b+K-1$"
Line 16, change "$m > -K+1, K < n < N_b+K-1$" to -- $m > -K+1, 0 \leq n \leq N_b + K-1$ --.

Signed and Sealed this

Twelfth Day of February, 2002

Attest:

*Attesting Officer*

JAMES E. ROGAN
*Director of the United States Patent and Trademark Office*